United States Patent [19]
Sera et al.

[11] 3,926,761
[45] Dec. 16, 1975

[54] AQUEOUS ELECTROPHORETIC COATING COMPOSITIONS COMPRISED OF POLYCARBOXYLIC ACID BINDER RESIN AND SPARINGLY SOLUBLE ALKALINE EARTH METAL MOLYBDATE

[75] Inventors: Katsuya Sera; Akira Kasari, both of Hiratsuka, Japan

[73] Assignee: Kansai Paint Company, Limited, Japan

[22] Filed: Apr. 4, 1974

[21] Appl. No.: 458,045

[30] Foreign Application Priority Data
Apr. 9, 1973  Japan.............................. 48-40604

[52] U.S. Cl............................. 204/181; 260/29.6 M
[51] Int. Cl.²......................................... C25D 13/06
[58] Field of Search ............ 260/29.6 M, 29.6 MM; 204/181

[56] References Cited
UNITED STATES PATENTS

| | | | |
|---|---|---|---|
| 3,290,235 | 12/1966 | Gilchrist ............................. | 204/181 |
| 3,366,563 | 1/1968 | Hart................................ | 260/29.6 H |
| 3,528,860 | 9/1970 | Kromstein.......................... | 148/6.15 |
| 3,531,384 | 9/1970 | Inouye et al. ..................... | 204/56 R |
| 3,575,909 | 4/1971 | Gilchrist...................... | 260/29.6 TA |
| 3,668,100 | 6/1972 | Frost et al.......................... | 204/181 |
| 3,687,824 | 8/1972 | Brown et al. ........................ | 204/40 |

OTHER PUBLICATIONS

"Corrosion and Corrosion Control," Uhlig, pp. 246, 257–265.

Primary Examiner—Joseph L. Schofer
Assistant Examiner—Peter Kulkosky
Attorney, Agent, or Firm—Larson, Taylor & Hinds

[57] ABSTRACT

An electrophoretic coating composition comprising an aqueous medium having dispersed therein a polycarboxylic acid binder resin and at least one of sparingly water-soluble alkaline earth metal molybdate.

10 Claims, No Drawings

AQUEOUS ELECTROPHORETIC COATING COMPOSITIONS COMPRISED OF POLYCARBOXYLIC ACID BINDER RESIN AND SPARINGLY SOLUBLE ALKALINE EARTH METAL MOLYBDATE

This invention relates to an electrophoretic coating composition, more particularly to an electrophoretic coating composition capable of producing electrophoretic coating film having rust inhibiting property.

In order to improve the rust resistance of an article to be coated with an electrophoretic coating composition, it is known to incorporate a chromic acid salt in the electrophoretic coating composition. However, although the article coated with the chromatecontaining composition can be effectively protected from corrosion, the use of chromates entails various objections due to the fact they they produce hexavalent chromium ions which are harmful to the human body and that they have an exceedingly high oxidizing property. According to electrophoretic coating process, excess coating composition which has been physically deposited on the electrophoretic coating film obtained has to be removed by washing with water, and the washing water resulting from this step contains harmful hexavalent chromium ions, causing a serious environmental pollution problem. Furthermore, the high oxidizing property causes oxidation of the binder resin contained in the coating composition to impair the fluidity of the composition and promotes electrolysis of water during electrophoretic coating operation, giving rise to bubbling. Consequently, the coating film obtained exhibits a poor appearance and the coating composition becomes markedly deteriorated in stability.

An object of this invention is to provide an electrophoretic coating composition capable of producing satisfactory electrophoretic coatings which effectively protect the article coated therewith from corrosion, free from the above drawbacks.

Another object of this invention is to provide an electrophoretic coating composition which is usable for electrophoretic coating process without entailing any environmental pollution problem in the washing water resulting from the process.

Still another object of this invention is to a stable electrophoretic coating composition capable of giving satisfactory coatings with a good appearance almost free of any deterioration due to the oxidation of binder resin and free of bubbling due to electrolysis of water during electrophoretic coating operation.

These objects of the present invention can be fulfilled by incorporating a sparingly water-soluble alkaline earth metal molybdate in an electrophoretic coating composition. The electrophoretic coating composition of the present invention comprises an aqueous medium having dispersed therein a polycarboxylic acid binder resin and at least one alkaline earth metal molybdate.

The term "sparingly water-soluble" or "sparingly soluble in water" used in connection with molybdates or other compounds throughout the specification and claims refers to property of the molybdate or the compound which is soluble in an amount of $10^{-1}$ to $10^{-6}$ g in 100 ml of water.

According to the researches of the present inventors it has been found that the electrophoretic coating composition containing a sparingly water-soluble molybdate can produce electrophoretic coatings which effectively protect the article coated therewith from corrosion. In fact the rust inhibiting effect attained by the present electrophoretic coating composition is as excellent as that obtained by the composition containing chromic acid salts. Further the researches of the present inventors have revealed that the specific molybdate to be used in the invention hardly oxidizes the binder resin contained in an electrophoretic coating composition, does not promote electrolysis of water during electrophoretic coating operation and is capable of giving a coating free of any deterioration in its appearance. The invention is further based on the novel finding that the above-mentioned specific molybdate does not exhibit a toxicity to the human body.

Usable as the polycarboxylic acid binder resins according to this invention are those conventionally used for electrophoretic coating compositions and usually have an acid value of 20 to 350, preferably 40 to 300. Representatives thereof are, for example, alkyd resin, epoxy resin modified with fatty acids, polyester resin, acrylic resin, polybutadiene modified with maleic acid, etc. These are used singly or in admixture. The binder resin is neutralized with a base and dispersed or dissolved (herein referred simply to as "disperse") in an aqueous medium.

It is essential in the invention to add alkaline earth metal molybdate sparingly soluble in water to the aqueous dispersion of the polycarboxylic acid binder resin, whereby the excellent effects disclosed above can be attained. On the contrary, if easily water-soluble alkaline earth metal molybdates are used, they deteriorate the binder resin in the electrophoretic coating composition and promote undesired hydrolysis of water during electrophoretic coating operation, since they are higher in oxidizing ability than those sparingly soluble in water. Examples of the alkaline earth metal molybdates to be used in the invention are strontium molybdate, barium molybdate and calcium molybdate. The alkaline earth metal molybdate is added to the aqueous dispersion in an amount of 0.1 to 10 weight percent, preferably 1 to 5 weight percent, based on the binder resin, to produce the present electrophoretic coating composition.

Where desired, pigments, hydrophilic solvent, defoaming agent, dispersant, and like additives can be added to the electrophoretic coating composition as in the conventional electrophoretic coating composition. Examples of the pigments are coloring pigments such as titanium white, carbon black, red iron oxide and extender pigments such as talc, clay, calcium carbonate and the like. Examples of the hydrophilic solvent are versatile and include alcoholic solvents and ester solvents. The amount of the hydrophilic solvent to be added may generally be in the range of 5 to 40 wt. percent based on the binder resin.

In the present invention there is no need to use chromates, but they can be added to the present composition, if so desired. In this case the chromates may be used in an amount less than 0.4 weight percent, based on the binder resin. This amount is far smaller than that used in the conventional chromate-containing electrophoretic coating compositions, with the result that the aforementioned drawbacks entailed by the conventional compositions containing a relatively large amount of chromates can effectively be avoided. The chromates to be used are those sparingly soluble in water and include, for example, barium chromate, strontium chromate and lead chromate.

Metals are coated with electrophoretic coating composition of this invention according to a conventional electrophoretic coating process. For example, an electrophoretic coating bath is prepared by diluting the coating composition with a suitable amount of water to a solid concentration of 6 to 20 wt. percent, preferably 9 to 15 wt. percent. An article to be coated which has not been treated or has been pretreated with a surface treating agent such as phosphates is immersed in the electrophoretic deposition bath so as to serve as an anode. Subsequently, direct current voltage is applied between both electrodes, whereby electrophoretic coating is formed on the article. The voltage to be applied is preferably at least 50 volts. Generally, it is sufficient to apply the voltage for about 30 seconds to 10 minutes. The electrophoretic coating thus prepared is then washed with water to remove excess coating composition from the surface and heated for drying, whereby a uniform hardened coating is obtained.

For a better understanding of this invention, examples are given below, in which parts and percentages are all by weight.

EXAMPLE 1

40 parts of "Epikote 828" (trade mark for epoxy resin manufactured by Shell Chemical Co., Great Britain) and 100 parts of linseed oil fatty acid were heated at 230°C to effect esterification reaction until the acid value of the product reached 10. Subsequently, 20 parts of maleic anhydride was added to the epoxy resin ester obtained, and the mixture was heated at 180°C for 4 hours for maleinization reaction. After the completion of the reaction, the product had an acid value of about 140. The reactions above were conducted in nitrogen gas atmosphere.

The maleinized epoxy ester thus prepared was partially neutralized with diethanolamine and thereby rendered water-soluble and then dispersed in deionized water, whereby an aqueous dispersion of a binder resin was obtained which had a pH of 7.8 and contained 40% of solid resin.

100 parts of the aqueous dispersion was kneaded with 6 parts of titanium white, 2 parts of red iron oxide, 2 parts of china clay and 0.4 part of carbon black to prepare a basic composition. 1.2 parts of strontium molybdate was added to the basic composition, and the resulting mixture was dispersed in a ball mill to prepare an electrophoretic coating composition.

EXAMPLE 2

An electrophoretic coating composition was prepared in the same manner as in Example 1 except that barium molybdate was used in place of strontium molybdate.

EXAMPLE 3

An electrophoretic coating composition was prepared in the same manner as in Example 1 except that calcium molybdate was used in place of strontium molybdate.

Comparison Example 1

0.2 part of strontium chromate was added to the same basic composition as in Example 1, and the mixture was dispersed in a ball mill to prepare an electrophoretic coating composition.

EXAMPLE 4

100 parts of polybutadiene (having a number average molecular weight of 1,200 and consisting of 89% 1,2-polybutadiene and 11% trans 1,4-polybutadiene), 60 parts of linseed oil and 32 parts of maleic anhydride were heated at 200°C to effect maleinization reaction until the acid value of the product reached about 170. To 700 parts of the maleinized product obtained was added 76 parts of propylene glycol, and the acid anhydride group was subjected to ring cleavage reaction (half-esterification) at 100°C. The reaction was terminated when the acid value of the reaction product reached 95.

The maleinized drying oil-modified polybutadiene thus prepared was partially neutralized with triethylamine and thereby rendered water-soluble and then dispersed in deionized water, whereby an aqueous dispersion of a binder resin was obtained which had a pH of 7.8 and contained 30% of solid resin.

100 parts of the aqueous dispersion was kneaded with 3 parts of titanium white, 6 parts of red iron oxide and 1.5 parts of china clay to prepare a basic composition. 0.21 part of strontium molybdate and 0.03 part of strontium chromate were added to the basic composition, and the mixture was dispersed in a ball mill to prepare an electrophoretic coating composition.

EXAMPLE 5

An electrophoretic coating composition was prepared in the same manner as in Example 1 except that 0.24 part of calcium molybdate and 0.03 part of strontium chromate were used in place of 1.2 parts of strontium molybdate.

Comparison Example 2

To the same basic composition as in Example 4 was added 0.09 part of strontium chromate, and the mixture was dispersed to obtain an electrophoretic coating composition.

The electrophoretic coating compositions obtained in Examples 1 to 5 and Comparison Examples 1 and 2 were diluted with deionized water to a solid content of 12% and placed into polyvinyl chloride containers respectively. The coating bath in each of the containers was maintained at 30° ± 1°C. A mild steel plate having a thickness of 0.8 mm and subjected to surface treatment with zinc phosphate was immersed in the bath as the anode, with a stainless steel plate used as the cathode. Electrophoretic coating operation was conducted by applying predetermined voltage for 3 minutes to form a coating film having a thickness of about 25 $\mu$ when dried. The voltage applied was 150 volts for the specimens of Examples 1 to 3 and Comparison Example 1 and 300 volts for the others. Immediately after the coating operation, the coated plates were washed with water and heated at 160°C for 30 minutes for drying, whereby coated test plates were obtained. The test plates thus prepared were subjected to salt spray test according to JIS Z 2371 with the results listed in Table 1 below.

Table 1

|  | Example 1 | Example 2 | Example 3 | Specimen Comparison Example 1 | Example 4 | Example 5 | Comparison Example 2 |
|---|---|---|---|---|---|---|---|
| Molybdate and/or chromate added | Strontium molybdate | Barium molybdate | Calcium molybdate | Strontium chromate | Strontium molybdate and strontium chromate | Calcium molybdate and strontium chromate | Strontium chromate |
| Test period |  |  |  |  |  |  |  |
| 5 days | 2.0 mm | 2.5 mm | 2.5 mm | 2.5 mm | 1.0 mm | 1.5 mm | 1.5 mm |
| 10 days | 3.0 mm | 4.0 mm | 3.5 mm | 4.0 mm | 2.5 mm | 3.0 mm | 3.0 mm |

The results given above reveal that the coating composition of this invention which contains an alkaline earth metal molybdate that is sparingly soluble in water and harmless to the human body or a mixture of such molybdate with a small amount of chromate exhibits a rust inhibiting effect equivalent or superior to that achieved by conventional compositions containing only a relatively large amount of chromate.

Further, the electrophoretic coating composition of Example 1 was diluted with deionized water to prepare an electrodeposition bath having a solid concentration of 10% and placed in a polyvinyl chloride container. Immediately thereafter or after predetermined period of storage electrophoretic deposition was conducted using the above bath in the same manner as above to prepare a test plate, except that voltages shown in Table 2 were applied. During the storage the bath was stirred at 30°C for predetermined period shown in Table 2 below with the lid of the container left open, while the water lost by evaporation was made up for with deionized water. The test plate thus obtained was evaluated by inspecting appearance of the coating film formed thereon. The results are shown in Table 2 below.

Table 2 also shows for comparative purpose the results obtained by the same tests as above using the following comparative compositions:

Comparison Example 3

An electrophoretic coating composition was prepared in the same manner as Comparison Example 1 except that 0.5 part of strontium chromate was used in place of 0.2 part of strontium chromate.

Comparison Example 4

An electrophoretic coating composition was prepared in the same manner as Comparison Example 1 except that 0.5 part of calcium chromate was used in place of 0.2 part of strontium chromate.

Table 2

|  |  | Initial |  | Stability of electrodeposition bath 1 week |  | 2 weeks |  | 4 weeks |  |
|---|---|---|---|---|---|---|---|---|---|
| Example 1 | Voltage (V) | 140 | 160 | 140 | 160 | 140 | 160 | 140 | 160 |
|  | Film thickness | 28 μ | 31 μ | 24 | 28 | 22 | 24 | 20 | 22 |
|  | State of coated surface | Excellent |  | Excellent |  | Good |  | Fairly good |  |
| Comparison Example 3 | Voltage (V) | 140 | 160 | 140 | 160 | 140 | 160 | 140 | 160 |
|  | Film thickness | 26 μ | 30 μ | 23 | 25 | 18 | 23 | 15 | 18 |
|  | State of coated surface | Excellent |  | Good |  | Fairly good |  | Poor |  |
| Comparison Example 4 | Voltage (V) | 140 | 160 | 140 | 160 | 140 | 160 | 140 | 160 |
|  | Film thickness | 27 μ | 30 μ | 22 | 26 | 17 | 22 | 13 | 16 |
|  | State of coated surface | Excellent |  | Good |  | Fairly good |  | Poor |  |

What we claim is:

1. An electrophoretic coating composition consisting essentially of an aqueous medium having dispersed therein a polycarboxylic acid binder resin and at least one sparingly water-soluble alkaline earth metal molybdate.

2. The electrophoretic coating composition according to claim 1, in which said sparingly water-soluble alkaline earth metal molybdate is selected from the group consisting of strontium molybdate, barium molybdate and calcium molybdate.

3. The electrophoretic coating composition according to claim 1, in which said sparingly water-soluble alkaline earth metal molybdate is present in the range of 0.1 to 10 weight percent, based on the binder resin.

4. The electrophoretic coating composition according to claim 3, in which said amount of the sparingly water-soluble alkaline earth metal molybdate is in the range of 1 to 5 weight percent, based on the binder resin.

5. The electrophoretic coating composition according to claim 1 which further contains at least one sparingly water-soluble chromic acid salt in an amount of less than 0.4 weight percent, based on the binder resin.

6. The electrophoretic coating composition according to claim 5, in which said sparingly water-soluble chromic acid salt is selected from the group consisting of barium chromate, strontium chromate and lead chromate.

7. The electrophoretic coating composition according to claim 5, in which said sparingly water-soluble chromic acid salt is present in combination with 1 to 5 weight percent of the sparingly water-soluble alkaline earth metal molybdate, based on the binder resin.

8. The electrophoretic coating composition according to claim 1, in which said polycarboxylic acid binder resin has an acid value of 20 to 350.

9. The electrophoretic coating composition according to claim 1, in which said polycarboxylic acid binder resin is selected from the group consisting of alkyd resin, epoxy resin modified with fatty acids, polyester resin, acrylic resin and polybutadiene modified with maleic acid.

10. In a method of electrophoretic coating wherein an article to be coated is contacted with an electrophoretic coating composition and electric current applied to effect electrophoretic coating on the surface of the article, the improvement in which the composition comprises an aqueous medium having dispersed therein a polycarboxylic acid binder resin and at least one sparingly soluble alkaline earth metal molybdate.

* * * * *